(12) United States Patent
Francis

(10) Patent No.: US 8,648,749 B1
(45) Date of Patent: Feb. 11, 2014

(54) ESTIMATION OF MULTIPLE ANGLES OF ARRIVAL OF SIGNALS RECEIVED BY AN ARRAY OF ANTENNA ELEMENTS

(75) Inventor: James Covosso Francis, Honeoye Falls, NY (US)

(73) Assignee: L-3 Services, Inc., San Diego, CA (US)

( * ) Notice: Subject to any disclaimer, the term of this patent is extended or adjusted under 35 U.S.C. 154(b) by 539 days.

(21) Appl. No.: 12/908,164

(22) Filed: Oct. 20, 2010

(51) Int. Cl.
*G01S 5/04* (2006.01)
*H04L 27/06* (2006.01)

(52) U.S. Cl.
USPC .......................................... 342/443; 375/341

(58) Field of Classification Search
CPC ........................................................ G01S 3/74
USPC ................... 342/417, 443, 433–434; 348/116; 375/341, 342
See application file for complete search history.

(56) References Cited

U.S. PATENT DOCUMENTS

| | | | | |
|---|---|---|---|---|
| 4,035,804 A | * | 7/1977 | Overbury | 342/405 |
| 5,572,220 A | * | 11/1996 | Cai | 342/442 |
| 2004/0164902 A1 | * | 8/2004 | Karlsson et al. | 342/449 |
| 2005/0007251 A1 | * | 1/2005 | Crabtree et al. | 340/539.13 |

OTHER PUBLICATIONS

Jian Li, et all., "Maximum Likelihood Angle Estimation for Signal With Known Waveforms", Sep. 1993, IEEE.*

* cited by examiner

*Primary Examiner* — Dao Phan
(74) *Attorney, Agent, or Firm* — Edward W. Callan

(57) ABSTRACT

A computer estimates multiple angles of arrival of a target signal received by an array of commutated antenna elements. In one aspect, samples of a received target signal obtained from an array of communicated antenna elements and from an element in an array of reference antenna elements are processed to make maximum-likelihood-estimations of multiple angles of arrival at which signals are received by the array of commutated antenna elements; and a display is mapped over time and frequency of the estimations, with the angle of arrival for a particular sample being represented by a variable given display feature.

13 Claims, 9 Drawing Sheets

0. $i \leftarrow 0$
1. $z_{k,0} \leftarrow y_{R,k}$
2. $\underline{\phi}_i \leftarrow \mathrm{argmin}_{\underline{\phi}} \sum_k \left| y_{C,k} - z_k \underline{a}_k(\underline{\phi}) \underline{x}(z_{*,i}, \underline{\phi}) \right|^2$ $\underline{x}(z_{*,i}, \underline{\phi}) = (\mathbf{U}^*\mathbf{U})^{-1} \mathbf{U}^* \mathbf{y}_C$ $\mathbf{U}_n = z_{n,i} \underline{a}_k(\underline{\phi})$ and $\mathbf{y}_{Cn} = y_{C,n}$
3. $z_{k,i+1} \leftarrow \dfrac{\mathbf{v}^* \mathbf{y}_k}{\|\mathbf{v}\|^2}$ $\mathbf{v} = \begin{pmatrix} 1 \\ \underline{a}_k(\underline{\phi}_i) \underline{x}(z_{*,i}, \underline{\phi}_i) \end{pmatrix}$ and $\mathbf{y}_k = \begin{pmatrix} y_{R,k} \\ y_{C,k} \end{pmatrix}$
4. $i \leftarrow i+1$
5. Go to 2.

FIG.3

ESTIMATION OF MULTIPLE ANGLES OF ARRIVAL OF SIGNALS RECEIVED BY AN ARRAY OF ANTENNA ELEMENTS

BACKGROUND OF THE INVENTION

The present invention generally pertains to estimating multiple angles of arrival of a target signal received by an array of commutated antenna elements.

Arrays of commutated antenna elements are commonly used in a system for estimating the angle of arrival (AOA) of a received target signal. It is known to obtain samples of the received signal from the array of commutated antenna elements, and, with a computer, to process the samples of the received target signal to estimate multiple angles of arrival of the target signal and other signals received by the array of commutated antenna elements.

SUMMARY OF THE INVENTION

In one aspect, the present invention provides a method of estimating multiple angles of arrival of a target signal received by an array of commutated antenna elements, comprising the steps of:

(a) obtaining samples of a received target signal from an array of commutated antenna elements and from an element in an array of reference antenna elements;

(b) with a computer, processing the obtained samples of the received target signal to make maximum-likelihood-estimations of multiple angles of arrival at which signals are received by the array of commutated antenna elements; and (c) mapping a display over time and frequency of said estimations, with the angle of arrival for a particular sample being represented by a variable color;

wherein step (b) comprises the step of:

(d) making maximum-likelihood-estimations $\phi_{MLE}$ of the multiple angles of arrival at which the target signal is received by the array of commutated antenna elements in accordance with the following computer processing step:

$$\underline{\phi}_0 \leftarrow \mathrm{argmax}_{\underline{\phi}} \underline{\mathrm{Color}} * A(A * \mathrm{diag}(\underline{\mathrm{Energy}})A)^{-1} A * \underline{\mathrm{Color}}$$

$$A_n \leftarrow \underline{a}_{k_n}(\underline{\phi})$$

$$\underline{\mathrm{Color}}_n \leftarrow \sum_{k \in R_n} y_{C,k} \overline{y_{R,k}}$$

$$\underline{\mathrm{Energy}}_n \leftarrow \sum_{k \in R_n} y_{R,k} \overline{y_{R,k}}$$

wherein $\phi_0$ approaches $\phi_{MLE}$, the subscript i denotes the iteration number, $y_C$ denotes an individual sample of the received target signal obtained from a single commutated antenna array element, $y_R$ denotes a sample of the received target signal obtained from a reference antenna array element; n ranges over time and frequency, the vector $\underline{a}_{k_n}(\underline{\phi})$ is the nth row of the matrix A, Color is a vector with tuples that are the color sequence of the target, the $n^{th}$ tuple $\mathrm{Color}_n$ denotes the $n^{th}$ color in the color sequence measured using the $n^{th}$ commutated element, $R_n$ denotes the set of all k for which the $n^{th}$ commutated element was used, the vector Energy is similarly defined and measures the energy sequence of the target, the $n^{th}$ row and the $i^{th}$ of column of the matrix A is the response of the $n^{th}$ element of the commutated array to a signal from angle $\phi_i$, with the $n^{th}$ row being given by $\underline{a}_{k_n}(\underline{\phi})$ for some $k_n$, diag (Energy) denotes a diagonal matrix where the diagonal elements are given by the vector Energy and the other elements are zero.

In a further aspect, the present invention provides a method of estimating multiple angles of arrival of a target signal received by an array of commutated antenna elements, comprising the steps of:

(a) obtaining samples of a received target signal from an array of commutated antenna elements and from an element in an array of reference antenna elements;

(b) with a computer, processing the obtained samples of the received target signal to make maximum-likelihood-estimations of multiple angles of arrival at which signals are received by the array of commutated antenna elements; and (c) mapping a display over time and frequency of said estimations, with the angle of arrival for a particular sample being represented by a variable given display feature.

In another aspect, the present invention provides a method of estimating multiple angles of arrival of a target signal received by an array of commutated antenna elements, comprising the steps of:

(a) obtaining samples of the received signal from the array of commutated antenna elements and from an element in an array of reference antenna elements;

(b) with a computer, processing the obtained samples of the received signal to estimate multiple angles of arrival of a target signal received by the array of commutated antenna elements; and (c) mapping a display over time and frequency of said estimations, with the angle of arrival for a particular sample being represented by a variable color;

wherein step (b) comprises the step of:

(d) making maximum-likelihood-estimations $\phi_{MLE}$ of the multiple angles of arrival at which the target signal is received by the array of commutated antenna elements in accordance with the following computer processing step:

$$\underline{\phi}_0 \leftarrow \mathrm{argmax}_{\underline{\phi}} \underline{\mathrm{Color}} * A(A * \mathrm{diag}(\underline{\mathrm{Energy}})A)^{-1} A * \underline{\mathrm{Color}}$$

$$A_n \leftarrow \underline{a}_{k_n}(\underline{\phi})$$

$$\underline{\mathrm{Color}}_n \leftarrow \sum_{k \in R_n} y_{C,k} \overline{y_{R,k}}$$

$$\underline{\mathrm{Energy}}_n \leftarrow \sum_{k \in R_n} y_{R,k} \overline{y_{R,k}}$$

wherein $\phi_0$ approaches $\phi_{MLE}$, the subscript i denotes the iteration number, $y_C$ denotes an individual sample of the received target signal obtained from a single commutated antenna array element, $y_R$ denotes a sample of the received target signal obtained from the reference antenna array element; n ranges over time and frequency, the vector $\underline{a}_{k_n}(\underline{\phi})$ is the nth row of the matrix A, Color is a vector with tuples that are the color sequence of the target, the $n^{th}$ tuple $\mathrm{Color}_n$ denotes the $n^{th}$ color in the color sequence measured using the $n^{th}$ commutated element, $R_n$ denotes the set of all k for which the $n^{th}$ commutated element was used, the vector Energy is similarly defined and measures the energy sequence of the target, the $n^{th}$ row and the $i^{th}$ of column of the matrix A is the response of the $n^{th}$ element of the commutated array to a signal from angle $\phi_i$, with the $n^{th}$ row being given by $\underline{a}_{k_n}(\underline{\phi})$ for some $k_n$, diag (Energy) denotes a diagonal matrix where the diagonal elements are given by the vector Energy and the other elements are zero.

In still another aspect, the present invention provides a method of estimating multiple angles of arrival of a target signal received by an array of commutated antenna elements, comprising the steps of:

(a) obtaining samples of a received target signal from an array of commutated antenna elements and from an element in an array of reference antenna elements;

(b) with a computer, processing the obtained samples of the received target signal to make maximum-likelihood-estimations of multiple angles of arrival at which signals are received by the array of commutated antenna elements;

(c) mapping a display of a distributions of said estimations over the angle of arrival for arbitrarily numbered received target signals; and (d) identifying the angle of arrival that is most prevalent in this distribution as a reflected angle.

The present invention additionally provides non-transitory computer readable storage media that include computer executable program instructions for causing one or more computers to perform and/or enable the steps of the respective above-described methods.

Additional features of the present invention are described with reference to the detailed description.

BRIEF DESCRIPTION OF THE DRAWING

FIG. 3 is a multiple-angle algorithm having a set of computer processing steps that can be used to facilitate one of the processing steps shown in FIG. 2.

DETAILED DESCRIPTION

Figure 1:
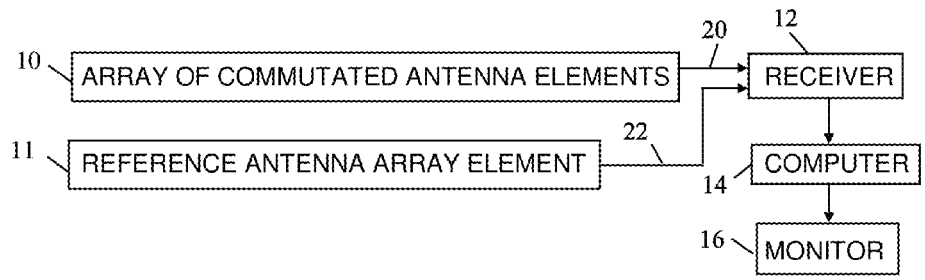
FIG. 1 is a block diagram of an exemplary system in which the method of the present invention is performed.

Referring to FIG. 1, an exemplary system in which the method of the present invention is performed includes an array of commutated antenna elements 10, an array of reference antenna elements 11, a receiver 12, a computer 14 and a computer display monitor 16. In some embodiments the receiver 12 and the computer 14 are combined in a single component. The computer 14 contains a digital signal processor and non-transitory computer readable storage media that includes computer executable program instructions for causing the computer to perform and/or enable the various processing steps that are described herein. These instructions are stored in the computer readable storage media of the computer when the computer is manufactured and/or upon being downloaded via the Internet or from a portable non-transitory computer readable storage media containing such instructions.

Figure 2:
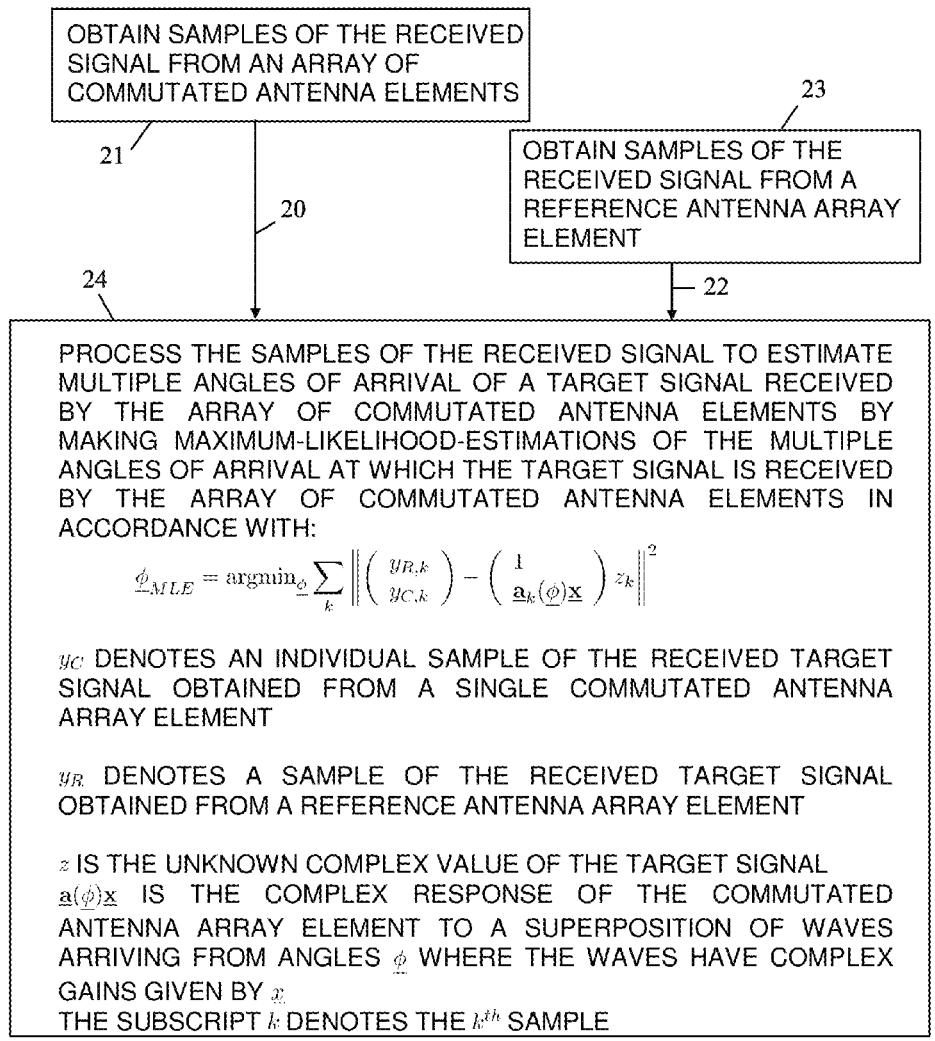
FIG. 2 is a diagram generally showing one aspect of the method of the present invention.

Referring to FIGS. 1 and 2, samples 20 of a target signal received by the array of commutated antenna elements 10 are obtained by the receiver 12, as shown at 21 in FIG. 2, and a sample 22 of the target signal is obtained by the receiver 12 from an element in the array of reference antenna elements 11, as shown at 23 in FIG. 2.

It is assumed that the samples 20, 22 of the received target signal are observed in zero-mean additive white Gaussian noise (AWGN).

The samples 20, 22 are obtained at different times, at different frequencies and/or by using different CDMA signal access codes. Individual samples 20 are obtained from different elements of the array of commutated antenna elements 10.

A set of samples 20, 22 of the received target signal is obtained sequentially over an interval that is a reciprocal of the bandwidth of the target signal.

The samples 20, 22 of the received target signal are processed by the computer 14, as shown at 24 in FIG. 2, to estimate multiple angles of arrival of a target signal received by the array of commutated antenna elements 10 by making maximum-likelihood-estimations of multiple angles of arrival at which signals are received by the array of commutated antenna elements in accordance with:

$$\underline{\phi}_{MLE} = \operatorname{argmin}_{\underline{\phi}} \sum_k \left\| \begin{pmatrix} y_{R,k} \\ y_{C,k} \end{pmatrix} - \begin{pmatrix} 1 \\ a_k(\underline{\phi})\underline{x} \end{pmatrix} z_k \right\|^2, \quad [\text{Eq. 1}]$$

wherein $y_C$ denotes an individual sample of the received target signal obtained from a single commutated antenna array element and $y_R$ denotes a sample of the received target signal obtained from a reference antenna array element; z is the unknown complex value of the target signal; $a(\phi)x$ is the complex response of the commutated antenna array element to a superposition of waves arriving from angles $\phi$ where the waves have complex gains given by $\underline{x}$; and the subscript k denotes the $k^{th}$ sample.

Equation 1 is constructed in accordance with the following assumption:

$$\begin{pmatrix} y_R \\ y_C \end{pmatrix} = \begin{pmatrix} 1 \\ \underline{a}(\underline{\phi})\underline{x} \end{pmatrix} z + \begin{pmatrix} v_R \\ v_C \end{pmatrix} \qquad [\text{Eq. 2}]$$

It is also assumed that the sampled commutated antenna array element may change and the sampled reference antenna array element is always the same element. Equation 2 may be taken as either temporal or spectral. Consider first the temporal case. In Equation 2, $v_C$ and $v_R$ are samples from an unknown complex additive white Gaussian noise process (AWGN); and z is an unknown complex value of the target signal. Observe that Equation 2 includes two expressions. The first expression indicates that the reference antenna array element sample $y_R$ is simply an observation of z in AWGN. In the absence of noise, $y_R$ would be exactly z. In the second expression, a complex (scalar) multiplier $\underline{a}(\underline{\phi})\underline{x}$ indicates that the commutated antenna array element sample $y_C$ is an observation of a complex multiple of z in AWGN; wherein $\underline{a}(\underline{\phi})\underline{x}$ is the complex response of the commutated antenna array element to a superposition of waves arriving from angles $\underline{\phi}$ where the waves have complex gains given by $\underline{x}$. With M as the number of waves, $\underline{\phi}$ is an M-dimensional real vector with tuples in an angle interval of $-\pi$ to $\pi$ radians and the row vector $\underline{a}(\underline{\phi})$ and the column vector $\underline{x}$ are M-dimensional and complex. The spectral case may be constructed as follows. Samples that are temporally sequential and taken on a single commutated element are partitioned into blocks and a Fast Fourier Transform (FFT) is computed for each block. Because $\underline{a}(\underline{\phi})\underline{x}$ is constant for the single commutated array element and the FFT is a linear transformation, Equation 2 still applies where $y_R$, $y_C$, $\underline{x}$, $v_R$ and $v_C$ are taken as points of their respective transforms.

In order to estimate $\underline{\phi}$, it is also necessary to estimate z and $\underline{x}$. The subscript k in the scalar multiplier $\underline{a}_k(\underline{\phi})\underline{x}$ recognizes that that the superposition of waves received by one commutated antenna array element may differ from the superposition of waves received by other commutated antenna array elements. It is also assumed that the noise power is constant and identical on the reference antenna array element and the commutated antenna array elements. Different noise powers are readily accommodated by an appropriate weighting by $$\frac{1}{\sigma_{R,k}}$$

and $$\frac{1}{\sigma_{C,k}},$$

as is customary in a weighted least-squares (LS) problem.

In alternative exemplary embodiments, the estimation of $\underline{\phi}$ in accordance with Equation 1 is facilitated by different techniques of numerical minimization, to wit: steepest descent and coordinate descent. Both techniques begin with an initial point and iteratively construct a sequence of points, and the objective function decreases monotonically on this sequence. The result is a minimum, and the minimum is a local minimum, in general.

At each iteration, the steepest descent moves in the direction of the negative gradient of the objective function. The negative gradient is a vector in the direction of the greatest rate of decrease on the objective function.

Alternatively, at each iteration, coordinate descent moves in a direction parallel to one of the coordinate axes. Thus, steepest descent converges more quickly than coordinate descent, in general. The usefulness of coordinate descent is that it may be simpler to construct the iteration.

In an exemplary embodiment in which the coordinate descent numerical minimization technique is used to facilitate the solution of Equation 1, $\underline{x}$ is expressed as a function of $\underline{\phi}$ and $z_k$. The coordinate descent technique proceeds by alternately optimizing over $z_k$ and $\underline{\phi}$ in accordance with the computer processing steps of the multiple-angle algorithm shown in FIG. 3, wherein $\underline{\phi}_i$ approaches $\underline{\phi}_{MLE}$. In such algorithm, the subscript i denotes the iteration number. In general, a stopping rule is required. One choice is to execute a fixed number of iterations. A second choice is to stop when the objective function, as specified in Equation 1, does not change substantially in consecutive iterations.

Figure 4:
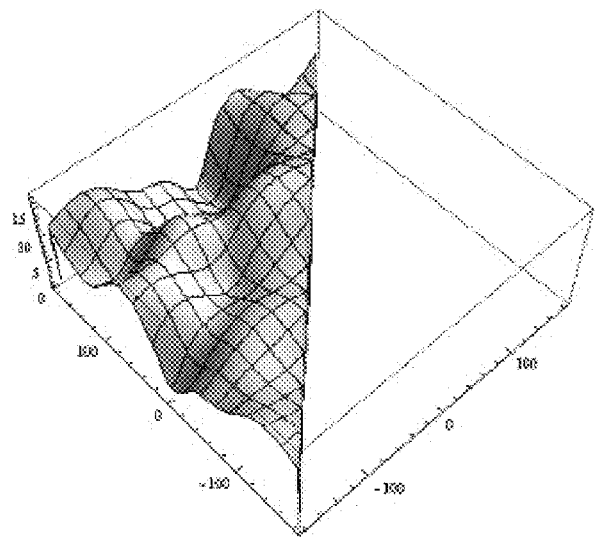
FIG. 4 illustrates a typical objective function for the type of numerical minimization that is facilitated by computer processing step 2 shown in FIG. 3.

Computer processing step 2 facilitates numerical minimization problem over $\underline{\phi}$. This warrants some additional discussion. FIG. 4 shows an exemplary objective function for this type of numerical minimization. The domain of the function may be regarded as one half of a hypercube (because of periodicity and symmetry) of a dimension that is the number of angles. FIG. 4 illustrates a typical two angle problem in that the objective function is nonlinear with multiple local minima; whereas hill climbing methods (e.g. gradient or coordinate descent) may be unsuitable. The difficulty with local minima increases with dimension.

In one exemplary embodiment, genetic programming is used to facilitate computer processing step 2. Genetic programming is modeled on biology. In the context of this exemplary embodiment, an organism is a specific choice of $\underline{\phi}$. The genetic programming model begins with an initial population of random organisms. Subsequent generations of organisms compete for survival, with survival being determined by the most favorable value of the objective function. This models the natural selection process in that primarily the most-fit organisms are retained in any generation. In each generation organisms are mated. The offspring of parent organisms is determined by a "crossover" rule. One possibility is $$\underline{\phi}_{Child} = \frac{\underline{\phi}'_{Parent1} + \underline{\phi}'_{Parent2}}{2}, \qquad [\text{Eq. 3}]$$

where the parent organisms (denoted by primes) are arranged so that the most similar angles are averaged; and the averaging is so computed that when the angles that are averaged are $+\pi$ and $-\pi$, the average angle is either is $-\pi$ or $+\pi$ and not 0 so that the branch discontinuity of the argument function is treated properly. Probabilistic mutations must also occur. Mutation is the mechanism of escape from local minima, as without mutation, an offspring organism will never differ significantly from two similar parents. In one version of this exemplary embodiment, the most similar estimations of $\underline{\phi}_{MLE}$ are averaged.

Figure 5:
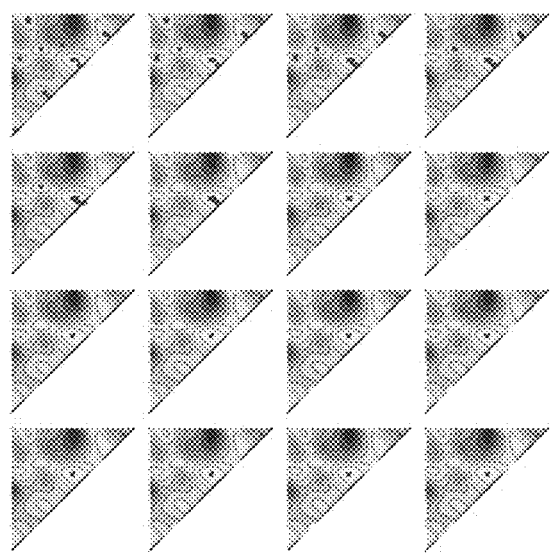
FIG. 5 illustrates a genetic programming execution for the objective function illustrated in FIG. 4.

FIG. 5 illustrates a genetic programming execution as described for the objection function illustrated in FIG. 4. Each generation of organisms is shown as a scattering of dark blue plots on a contour plot of the objective function. The sequence is as words on a page, from left to right and then top to bottom. Observe that initially the organisms populate all of the hill tops. (Each offspring organism is also improved by a hill climb.) Eventually, all of the organisms populate a single hill top corresponding to the optimal solution.

In some embodiments only computer processing steps 0, 1 and 2 are executed. This is a desirable algorithmic simplification. It also suggests a useful perspective for automatic signal collection.

For this simplified algorithm, i=0. Referring to the expression, $x(z_{*,i},\phi)=(U^*U)^{-1}U^*y_C$ in step 2, in order to compute $(U^*U)^{-1}$ it is not necessary to know $z_{n,0}$ for the expression $U_n=z_{n,0}\underline{a}_k(\phi)$. Rather, it is sufficient to know $|z_{n,0}|^2$ and $z_{n,0}=\overline{y_{R,n}}$. Thus, it is sufficient to know $|y_{R,n}|^2$. Similarly, to compute $U^*y_C$ it is not necessary to know $z_{n,0}$. Rather, it is sufficient to know $y_{C,n}\overline{y_{R,n}}$. The same is true for the expression arg min $_\phi \Sigma_k |y_{C,k} - z_k \underline{a}_k(\phi) x(z_{*,i},\phi)|^2$. Thus, the computation of $\phi_0$ in step 2 depends only on $y_{C,n}\overline{y_{R,n}}$ and $|y_{R,n}|^2$. This suggests that the quantity $y_{C,n}\overline{y_{R,n}}$ can be used to make simplified estimations of the angles of arrival, as next described.

Figure 6:
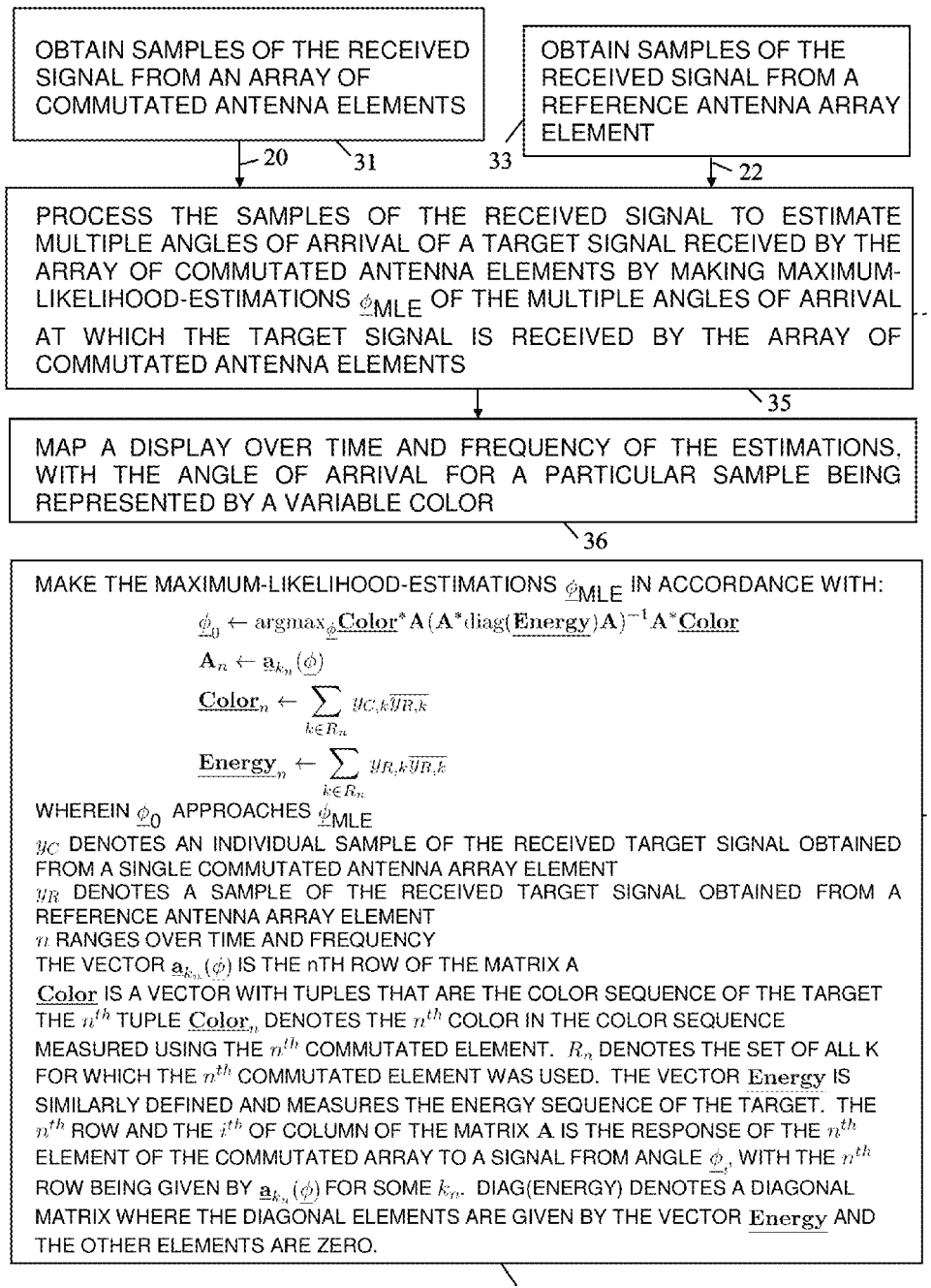
FIG. 6 is a diagram generally showing another aspect of the method of the present invention.

Referring to FIGS. 1 and 6, in another exemplary embodiment of the present invention, samples 20 of a target signal received by the array of commutated antenna elements 10 are obtained by the receiver 12, as shown at 31 in FIG. 6, and a sample 22 of the target signal is obtained by the receiver 12 from an element in the array of reference antenna elements 11, as shown at 33 in FIG. 6.

To the extent that they are not incompatible, the conditions and assumptions applicable to the embodiment described with reference to FIGS. 1 and 2 are also applicable to the embodiment described with reference to FIGS. 1 and 6.

The samples 20, 22 of the received target signal are processed by the computer 14, as shown at 35 and 35a in FIG. 6, to make maximum-likelihood-estimations $\phi_{MLE}$ of the multiple angles of arrival at which the target signal is received by the array of commutated antenna elements in accordance with the following computer processing step:

$$\underline{\phi}_0 \leftarrow \mathrm{argmax}_{\underline{\phi}} \underline{\mathrm{Color}} * A(A * \mathrm{diag}(\underline{\mathrm{Energy}})A)^{-1} A * \underline{\mathrm{Color}} \quad [\text{Eq. 4}]$$

$$A_n \leftarrow \underline{a}_{k_n}(\underline{\phi})$$

$$\underline{\mathrm{Color}}_n \leftarrow \sum_{k \in R_n} y_{C,k} \overline{y_{R,k}}$$

$$\underline{\mathrm{Energy}}_n \leftarrow \sum_{k \in R_n} y_{R,k} \overline{y_{R,k}}$$

wherein $\phi_0$ approaches $\phi_{MLE}$, the subscript i denotes the iteration number, $y_C$ denotes an individual sample of the received target signal obtained from a single commutated antenna array element, $y_R$ denotes a sample of the received target signal obtained from a reference antenna array element; n ranges over time and frequency, the vector $\underline{a}_{k_i}(\phi)$ is the nth row of the matrix A, Color is a vector with tuples that are the color sequence of the target, the $n^{th}$ tuple $\mathrm{Color}_n$ denotes the $n^{th}$ color in the color sequence measured using the $n^{th}$ commutated element, $R_n$ denotes the set of all k for which the $n^{th}$ commutated element was used, the vector Energy is similarly defined and measures the energy sequence of the target, the $n^{th}$ row and the $i^{th}$ of column of the matrix A is the response of the $n^{th}$ element of the commutated array to a signal from angle $\phi_i$, with the $n^{th}$ row being given by $\underline{a}_{k_n}(\phi)$ for some $k_n$, diag (Energy) denotes a diagonal matrix where the diagonal elements are given by the vector Energy and the other elements are zero. The maximization may be accomplished exactly as described previously using genetic programming, with the exception that organisms are selected by the largest rather than smallest value of the objective function.

The forgoing computer processing step is a simplified variation of computer processing step 2 of the multiple-angle algorithm shown in FIG. 3.

Figure 7:
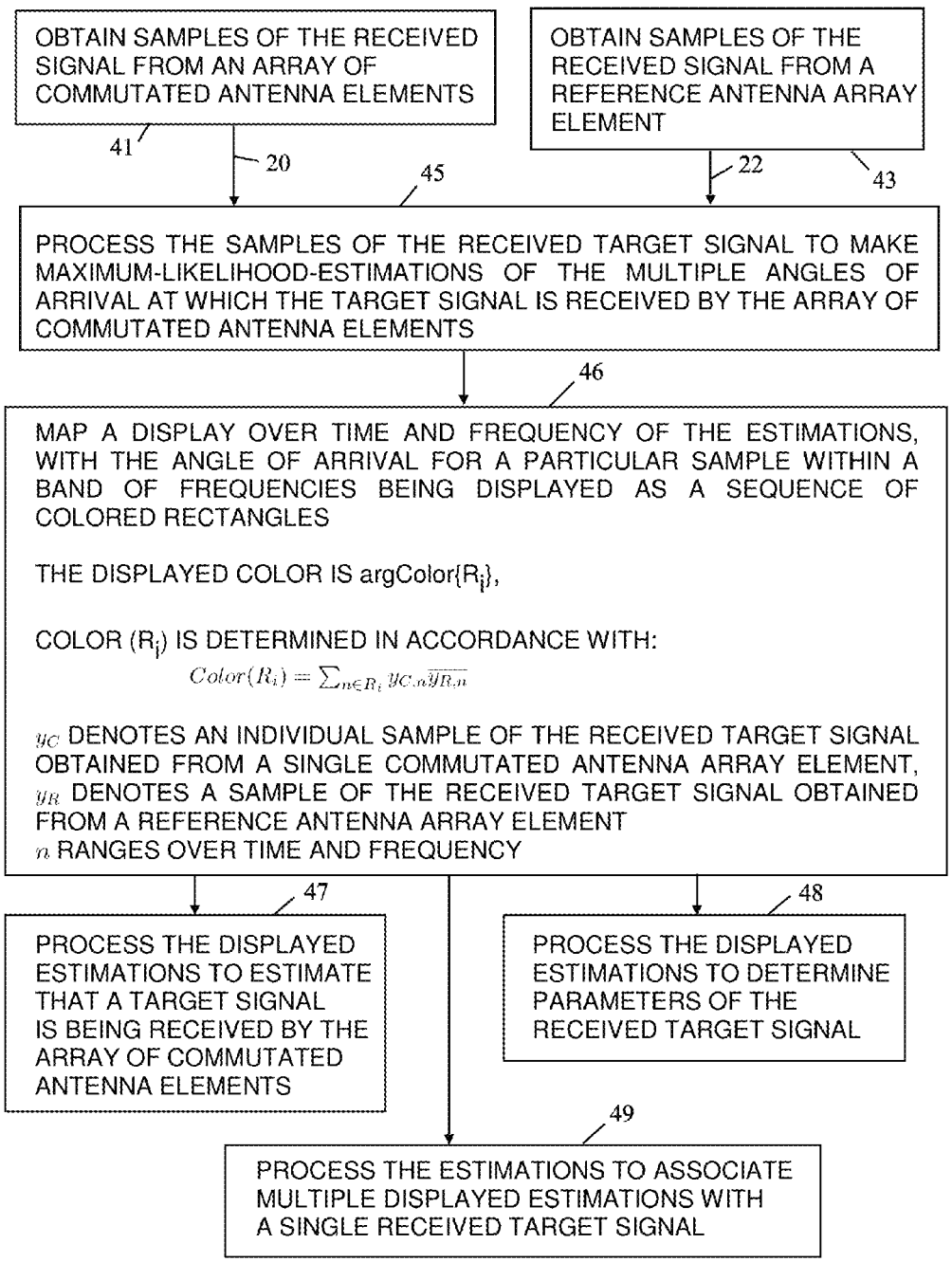
FIG. 7 is a diagram generally showing a further aspect of the method of the present invention.

Referring to 36 in FIG. 6, the computer 14 maps a display over time and frequency of these maximum-likelihood-estimations $\phi_{MLE}$ of the multiple angles of arrival, with the angle of arrival for a particular sample being represented by a variable color;

Referring to FIGS. 1 and 7, in a further exemplary embodiment of the present invention, samples 20 of a target signal received by the array of commutated antenna elements 10 are obtained by the receiver 12, as shown at 41 in FIG. 7, and a sample 22 of the target signal is obtained by the receiver 12 from an element in the array of reference antenna elements 11, as shown at 43 in FIG. 7.

To the extent that they are not incompatible, the conditions and assumptions applicable to the embodiment described with reference to FIGS. 1 and 2 are also applicable to the embodiment described with reference to FIGS. 1 and 7.

The samples 20, 22 of the received target signal are processed by the computer 14, as shown at 45 in FIG. 7, to estimate multiple angles of arrival of a target signal received by the array of commutated antenna elements 10 by making maximum-likelihood-estimations of multiple angles of arrival at which signals are received by the array of commutated antenna elements in accordance with Equation 1, Equation 4 or some other algorithm for making such estimations.

Figure 8:
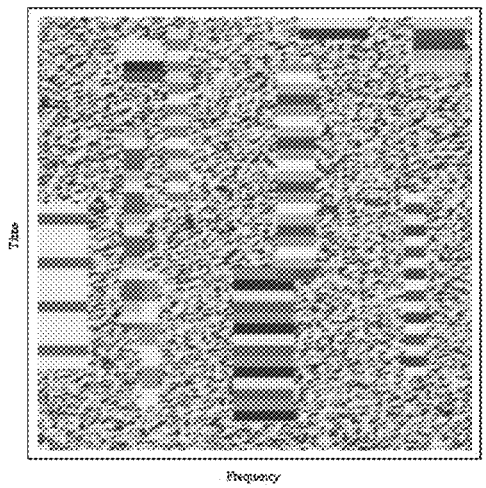
FIG. 8 shows a display over time and frequency of colored rectangles representing maximum-likelihood-estimations of multiple angles of arrival at which target signals are received by the array of commutated antenna elements in accordance with the method shown in FIG. 6, with the angle of arrival for a particular sample being represented by color so that an estimation over time of the angle of arrival for a particular sample within a band of frequencies is displayed as a colored rectangle.

The computer 14 maps a display over time and frequency of these estimations, as shown at 46 in FIG. 7, with the angle of arrival for a particular sample being represented by a variable color so that a maximum-likelihood-estimation of the angle of arrival for a particular sample within a band of frequencies is displayed as a sequence of colored rectangles, as shown in FIG. 8. Although the displayed variable color is shown in FIG. 8 is a variable shade of gray, in the exemplary embodiment the displayed variable color is a variable shade of blue. The mapped display is shown on the computer display monitor 16.

Referring again to FIG. 7, the displayed estimations are processed to determine that a target signal is being received by the array of commutated antenna elements, as shown at 47; the displayed estimations are processed to estimate parameters of the received target signal, as shown at 48; and/or the estimations are processed to associate multiple displayed estimations with a single received target signal, as shown at 49.

Referring to FIG. 8, maximum-likelihood-estimations of the angle of arrival are displayed in separate vertical columns of colored rectangles for each set of sequentially obtained samples. FIG. 8 illustrates rectangles representing the receipt of multiple signals within different frequency bandwidths, with each of the vertical columns of colored rectangles representing a signal received over time within in the displayed bandwidth. The color sequence may be used to compute a set of multiple angles of arrival in accordance with computer processing steps 0, 1 and 2, which are discussed above.

The exemplary example of FIG. 8 illustrates a particular case where the length of the commutation interval is less than the length of a typical transmission. Each column is composed of rectangles that have relatively constant width and constant height; and the color sequence is periodic. Each column represents a single received signal because the frequency bandwidth is constant. Each column is vertically contiguous because the signal is constantly present for some interval of time. The height of a rectangle is determined by the length of time over which the receiver obtains samples from a single commutated antenna array element and from the reference antenna array element (i.e. the commutation interval). When a different commutated antenna array element is sampled the color changes if the angle of arrival of the sampled received signal is different at the different antenna array element. Because the commutated array has only a finite number of elements (four in this example), there is only a finite number of variable color shades for any column. In the example shown in FIG. 8, the color sequences are periodic because the sampled array of commutated antenna elements is periodic.

Samples 22 taken sequentially from the reference antenna array element are partitioned into blocks and a FFT is computed for each successive block to obtain $y_{R,n}$. Similarly, individual samples taken sequentially from a single commutated antenna array element are partitioned into blocks and a FFT is computed for each successive block to obtain $y_{C,n}$.

It is a computational convenience to display a rectangular representation of the color $R_i$. Each rectangle is characterized by its shape and position, and its color. In FIG. 8, the color of each rectangle is an average color of sample points over the range of the rectangle.

Referring to Equation 2, observe that in the absence of noise $y_R = z$ and $y_C = a(\phi)xz$. Thus for non-zero z, the quantity $\arg\{y_C \overline{y_R}\} = \arg\{a(\phi)\overline{x}\}$ depends only on the angle of arrival, and not on the value z of the target signal. In general, $\arg\{y_{C,n} \overline{y_{R,n}}\} = \arg\{a_k(\phi)\overline{x}\}$ for the $n^{th}$ sample taken from the $k^{th}$ commutated element. In the simplest case where there is only a single angle of arrival, the vector quantities may be regarded as scalar and $\arg\{y_{C,n}\overline{y_{R,n}}\} = \arg\{a_k(\phi)\} + \arg\{\overline{x}\}$. Thus, with n ranging over time and frequency, the color of the rectangle representing the angle of arrival, $\text{Color}(R_i) = \Sigma_{n \in R_i} y_{C,n} \overline{y_{R,n}}$ for varying k, wherein $y_C$ denotes an individual sample of the received target signal obtained from a single commutated antenna array element, $y_R$ denotes a sample of the received target signal obtained from a reference antenna array element; and n ranges over time and frequency.

The displayed color is $\arg\text{Color}\{R_i\}$. The computer 14 determines $\text{Color}\{R_i\}$ in accordance with: $\text{Color}(R_i) = \Sigma_{n \in R_i} y_{C,n} \overline{y_{R,n}}$.

Supervised learning methods may be used to construct a classifier that labels a subset of rectangles as either a target instance or not. The rectangles by which the estimations of the angles of arrival are displayed are processed to determine that a target signal is being received by the array of commutated antenna elements, as shown at 47 in FIG. 7. Also, the displayed rectangles representing estimations of the angle of arrival of received signals are processed to estimate parameters of the received target signal, as shown at 48 in FIG. 7.

Figure 9:
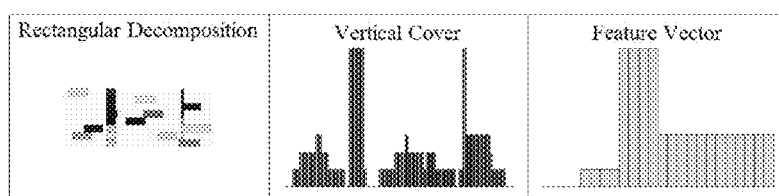
FIG. 9 is set of three panes for use in explaining vector feature extraction for the display shown in FIG. 8.

An exemplary embodiment of such a supervised learning method utilizes vector feature extraction, which is explained with reference to FIGS. 8 and 9. Referring to FIG. 9, the left pane shows the result of rectangular decomposition, which is accomplished by processing the rectangles shown in FIG. 8 into as few rectangles as possible. For each frequency point on the horizontal axis of the display shown in the left pane of FIG. 9, the vertical cover of the rectangular decomposition is determined by counting the number of rectangles that overly this point. The center pane of FIG. 9 shows the vertical cover for the rectangular decomposition of the left pane as a bar plot. By observing the left and center panes one can determine that there are two targets, as represented by the two tall columns in both the left and center panes. The right pane of FIG. 9 shows extraction of a specific feature vector.

This specific extracted feature vector is obtained by taking an interval of the vertical cover in the center pane that includes the rightmost target. Here, the interval is twenty-four frequency points; the interval is translated so that the left boundary of the target begins after eight frequency points; and the target signal is four frequency points wide. In this example, this extracted specific feature vector indicates that there is a target signal that begins after eight frequency points and is four frequency points wide.

Figure 10:
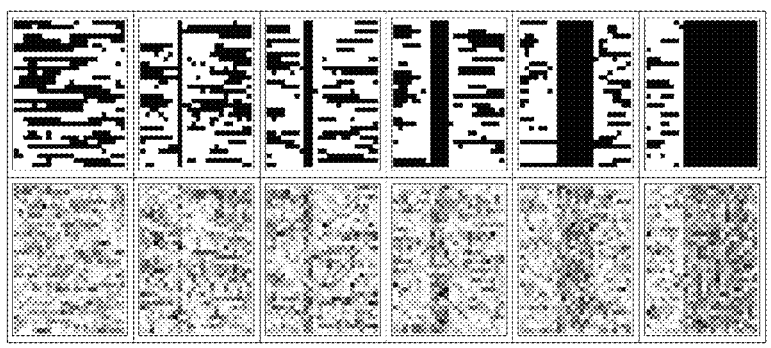
FIG. 10 shows feature vectors generated for the purpose of training a supervised learning method classifier that labels a subset of rectangles as either a target instance or not.

FIG. 10 shows feature vectors generated for the purpose of training a desired classifier. Each pane shows a collection of feature vectors with a single vector in each row, and each pane is for a different category and different noise. Left to right, there are six target categories, 1) no target, 2) 1-point-width target, 3) 2-point-width target, 4) 4-point-width target, 5) 8-point-width target, 6) 16-point-width target. Top to bottom, the top row has minimal noise and the bottom row has maximal noise. Note that what may appear to be noise in the minimal noise feature vectors results simply from the presence of other targets. Additionally, in any single pane a common category, such as frequency width, may be identified. This is easier for the top row than for the bottom row. Also, in the bottom row a frequency-width classifier is more difficult to identify for targets of narrower width.

A multiple category classifier constructed using these training vectors may be used to test for a target having a particular parameter from one of the training categories, for example, a target beginning after eight frequency points. By translating the window for feature vector extraction over the horizontal extent of the vertical cover one may test for a target of a particular frequency width. Observe that this construction is somewhat analogous to a classical construction of a multiple hypothesis test for a single target. Here, the difference is that this multiple category classifier works in the presence of multiple targets.

To construct the desired multiple category classifier one may use any of a number of readily available tool sets, such as Weka (Waikato Environment for Knowledge Analysis), which is a suite of machine learning software written in Java, developed at the University of Waikato, New Zealand. WEKA is free software available under the GNU General Public License.

As an alternative to Weka, one may prefer to use the tool set LIBSVM to construct a Support Vector Machine (SVM), rather than a logistic classifier.

Depending upon computational resources, it may be desirable to augment the feature vector as described with an estimate of signal-to-noise ratio (S/N). This may be accomplished by applying the multiple-angle algorithm shown in FIG. 3 for the color sequence associated with the category.

The computer 14 processes the estimations to associate multiple displayed estimations with a single received target signal, as shown at 49 in FIG. 7. Unsupervised learning methods may be used to cluster multiple instances of a single target and separate multiple targets. The most useful feature for this is the color sequence, although other attributes associated with standard target types may be used. One significant advantage of color sequence is that it bijects with $\phi$ but avoids the direct calculation of $\phi$, as required in the multiple-angle algorithm shown in FIG. 3.

In an exemplary embodiment of such an unsupervised learning method, the computer 14 utilizes the k-means algorithm to partition a collection of points into k clusters where the points in any single cluster are as similar as possible. In this exemplary embodiment, each point represents the color sequence a complex vector. Squared Euclidean distance (i.e. the square of the $L_2$ norm) is an appropriate similarity measure. Two color sequences as complex vectors are determined to be most similar when the squared Euclidean distance between them is minimized. Commonly, the k-means algorithm begins initially with a random choice of k points as cluster centers. Alternately, points are assigned to the closest clusters. The cluster centers are then recalculated using the points that have been assigned to the respective cluster. With a squared Euclidean distance, the cluster center that is minimally distant from its associated points is the mean of the points. K-means is a specific case of the more general Expectation Maximization (EM) algorithm and may be shown to be optimal in a certain sense with normally distributed points in each cluster.

Figure 11:
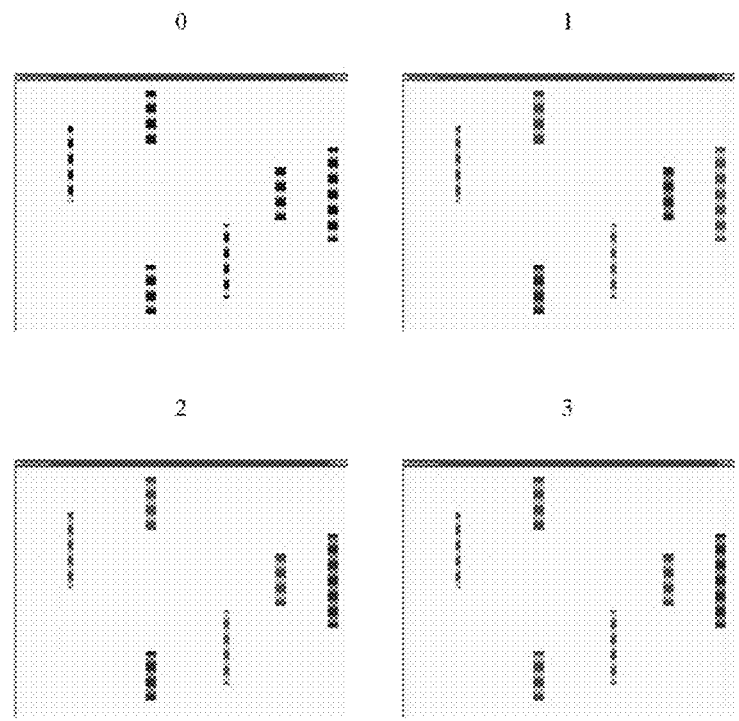
FIG. 11 is a diagram showing clusters of rectangles extracted from the display shown in FIG. 8.

Clusters displayed by using the k-means algorithm are shown in FIG. 11, in which the execution sequence is numbered at the top of each pane. Here, k=3 and there are six clusters that represent instances of three targets. The objective is to determine instances of clusters that represent the same target. The target instances are initially shown as gray, as shown in pane "0", as there is no association of possibly multiple instances when there is only one target. For each iteration, as shown in panes 1, 2 and 3, the clusters are shown in different shades of gray. In the final iteration (pane "3"), the correct assignments may be seen, in that the instances that are the same color are for the same target.

K-means is a probabilistic algorithm. What is commonly done is to seed the algorithm with a randomly chosen set of initial cluster centers. The algorithm is usually iterated until the squared error no longer decreases or decreases minimally. The squared error quantity decreases monotonically until the optimal assignment of the clusters to specific targets is determined. The squared error is the total of the squared distances between each point and its respective center cluster center. The final error is dependent on the initial random set of cluster centers. In general, the error declines until some minimal value is attained. Commonly, this process is repeated with many initial random cluster centers and the best assignment is retained.

Since the rectangular representation of the angle of arrival requires a computation of the shape and position of the rectangles, the computer 14 processes the estimations of the angle of arrival to display as few rectangles as possible. In one exemplary embodiment rectangular decomposition is used to accomplish such a display.

Referring again to FIG. 8, rectangular decomposition is determined row-by-row where the rows are delimited by commutation boundaries (i.e. where the color of a column changes). In a continuous space any rectangle may be written as the union of two other rectangles and there are many choices for the two other rectangles. What is desired is a sparse decomposition. That is, the rectangular decomposition should result in as few rectangles as possible.

There are numerous approaches to constructing such a sparse decomposition. One method for computing a sparse-decomposition solution is to minimize a squared-error objective of $y_{C,n}\overline{y_{R,n}}$, with an $L_1$ penalty on the solution. The $L_1$ penalty is well known to induce sparseness. In the complex signal case, this requires convex programming and may be difficult to solve in real time. The real signal case is much simpler, where an algorithm such as Least-Angle Regression (LARS) may be used.

Alternatively, a preferable method for computing the rectangular decomposition is Forward Regression. In an exemplary embodiment, the computer 14 uses a forward regression method of rectangular decomposition that is based upon predictors of varying shape and position of the rectangles. With this method, rectangles incrementally enter into the decomposition with a weight that minimizes the squared-error objective of $y_{C,n}\overline{y_{R,n}}$. The entering rectangle is the one that has maximum correlation (squared-modulus normalized by the area of the respective rectangle). Correlation is particularly simple, and is nothing more than the color of the rectangle. Moreover, by a proper construction, this algorithm is linear in the maximum width of a rectangle (i.e. the bandwidth of the signal for which the rectangular decomposition is computed).

Figure 12:
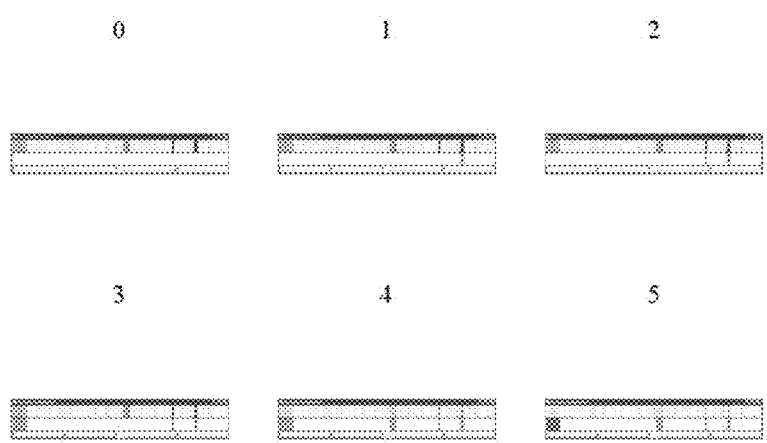
FIG. 12 shows rectangular decomposition for the display shown in FIG. 8.

FIG. 12 is set of six panes numbered 0, 1, 2, 3, 4 and 5 demonstrating successive iterations of an exemplary rectangular decomposition. In this example LARS is applied to a real signal. In each of panes 1, 2, 3, 4 and 5 of FIG. 12, the signal in the second row from the bottom is the current approximation of the signal that is being decomposed, and signal in the second row from the top is the difference (i.e. error) between the signal that is being decomposed and current approximation. For each iteration, the approximation is a collection of rectangles. Initially (pane 0), the approximation is everywhere zero and the difference between the signal being decomposed and the current approximation is simply the signal being decomposed. For each iteration (panes 1, 2, 3, 4 and 5), the decomposition adds rectangles to the approximation and the approximation becomes an increasingly accurate representation of the signal being decomposed. Upon the final iteration the difference is approximately zero everywhere, as seen in pane 5 of FIG. 12.

One computational simplification with respect to the ordinary LARS algorithm is evidenced in the example demonstrated in FIG. 12. Because all subsequent processing requires only Color(R) it is only necessary to determine the boundaries of R. Thus, a convenient computational simplification is to subsume a smaller rectangle (i.e. remove the smaller rectangle from the set of predictors) once it is covered by a large rectangle.

It should be noted that rectangular decomposition also provides a highly effective method of compression. That is, the receiver may record the signal on the reference element for later additional processing. It is only necessary to record signals that are covered by rectangles in time and frequency, and a signal not covered by a rectangle may be regarded as zero. When the zero signal is encoded by run length coding, for example, the resulting compression ratio is approximately equal to the total bandwidth divided by the occupied bandwidth.

Another problem of significant practical importance for target signal direction finding is the problem of reflections (or alternatively, multipath). Traditionally, radio direction finding uses a single angle-of-arrival model. In the presence of a signal arriving from multiple angles, a single angle-of-arrival estimate might not be correct.

In still another exemplary embodiment of the present invention, as described with reference to FIGS. 1, 13 and 14, the direct and reflected angles-of-arrival for any single target are identified from the distribution of the angles of arrival for multiple signals in the environment. Because the direct angle for multiple signals will likely vary, the prevalence of a particular angle for multiple signals probably indicates a reflection. An empirical estimate of the distribution of the angles is made that is most prevalent in this distribution is identified as the reflected angle.

Figure 13:
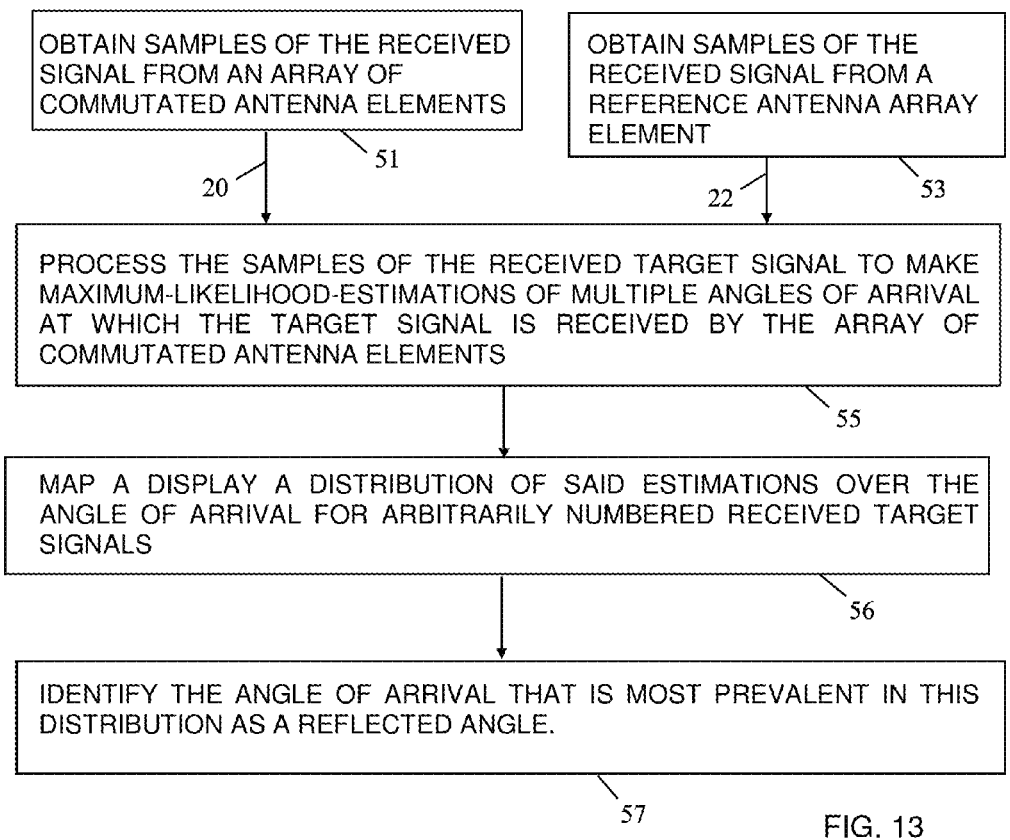
FIG. 13 is a diagram generally showing still another aspect of the method of the present invention.

Referring to FIGS. 1 and 13, in this exemplary embodiment, samples 20 of a target signal received by the array of commutated antenna elements 10 are obtained by the receiver 12, as shown at 51 in FIG. 31, and samples 22 of the target signal are obtained by the receiver 12 from an element in the array of reference antenna elements 11, as shown at 53 in FIG. 13.

To the extent that they are not incompatible, the conditions and assumptions applicable to the embodiment described with reference to FIGS. 1 and 2 are also applicable to the embodiment described with reference to FIGS. 1 and 13.

The samples 20, 22 of the received target signal are processed by the computer 14, as shown at 55 in FIG. 13, to estimate multiple angles of arrival of a target signal received by the array of commutated antenna elements 10 by making maximum-likelihood-estimations of multiple angles of arrival at which signals are received by the array of commutated antenna elements in accordance with Equation 1, Equation 4 or some other algorithm for making such estimations.

Figure 14:
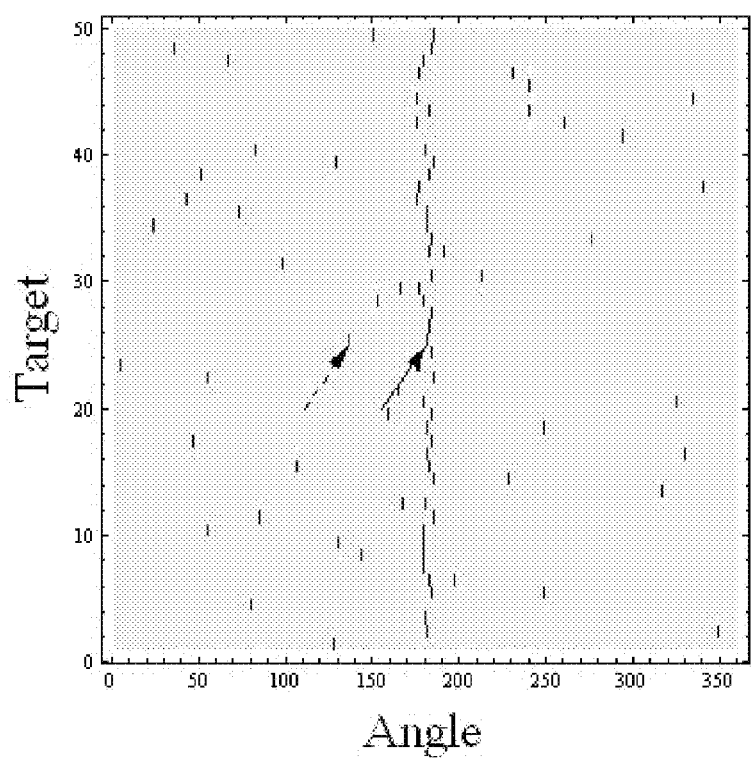
FIG. 14 is an exemplary display over an arbitrary target number and angle of maximum-likelihood-estimations of multiple angles of arrival at which target signals are received when the received signals include target signals that have been reflected 180 degrees.

The computer 14 maps a display of a distribution of said estimations over the angle of arrival for arbitrarily numbered received target signals, as shown in FIG. 14 and at 56 in FIG. 13. The mapped display is shown on the computer display monitor 16.

FIG. 14 is an exemplary display over an arbitrary target number and angle of maximum-likelihood-estimations of multiple angles of arrival at which target signals are received when the received signals include target signals that have been reflected 180 degrees. The vertical axis is an arbitrary target signal number. There are 50 target signals in this example. The horizontal axis is the angle of arrival. For any signal there is a reflected angle of arrival and a direct angle of arrival. For all signals the reflected angle of arrival is nearly a constant 180 degrees, as the position of the reflector is not changing. On the other hand, for each signal the direct angle of arrival changes with the position of the transmitter relative to the receiver.

In this example, there are two arrows associated with target signal number 25, one at 136 degrees and other at 181 degrees. The arrow at 136 degrees identifies the direct angle of arrival; and the arrow at 181 degrees identifies a reflection because of the prevalence of this angle over multiple signals. The angle of arrival that is most prevalent in this distribution is thereby identified as a reflected angle, as shown at 57 in FIG. 13.

The benefits specifically stated herein do not necessarily apply to every conceivable embodiment of the present invention. Further, such stated benefits of the present invention are only examples and should not be construed as the only benefits of the present invention.

While the above description contains many specificities, these specificities are not to be construed as limitations on the scope of the present invention, but rather as examples of the preferred embodiments described herein. Other variations are possible and the scope of the present invention should be determined not by the embodiments described herein but rather by the claims and their legal equivalents.

Regarding the method claims, except for those steps that can only occur in the sequence in which they are recited, and except for those steps for which the occurrence of a given sequence is specifically recited or must be inferred, the steps of the method claims do not have to occur in the sequence in which they are recited.

The invention claimed is:

1. A method of estimating multiple angles of arrival of a target signal received by an array of commutated antenna elements, comprising the steps of:
   (a) obtaining samples of the received signal from the array of commutated antenna elements and from an element in an array of reference antenna elements;
   (b) with a computer, processing the obtained samples of the received signal to estimate multiple angles of arrival of a target signal received by the array of commutated antenna elements; and
   (c) mapping a display over time and frequency of said estimations, with the angle of arrival for a particular sample being represented by a variable color;
   wherein step (b) comprises the step of:
   (d) making maximum-likelihood-estimations $\phi_{MLE}$ of the multiple angles of arrival at which the target signal is received by the array of commutated antenna elements in accordance with the following computer processing step:

$$\phi_0 \leftarrow \mathrm{argmax}_\phi \underline{\mathrm{Color}} * A(A * \mathrm{diag}(\underline{\mathrm{Energy}})A)^{-1}A * \underline{\mathrm{Color}}$$

$$A_n \leftarrow \underline{a_{k_n}}(\phi)$$

$$\underline{\mathrm{Color}}_n \leftarrow \sum_{k \in R_n} y_{C,k} \overline{y_{R,k}}$$

$$\underline{\mathrm{Energy}}_n \leftarrow \sum_{k \in R_n} y_{R,k} \overline{y_{R,k}}$$

wherein $\phi_0$ approaches $\phi_{MLE}$, the subscript i denotes the iteration number, $y_C$ denotes an individual sample of the received target signal obtained from a single commutated antenna array element, $y_R$ denotes a sample of the received target signal obtained from the reference antenna array element; n ranges over time and frequency, the vector $a_{k_n}(\phi)$ is the nth row of the matrix A, Color is a vector with tuples that are the color sequence of the target, the tuple $\mathrm{Color}_n$ denotes the $n^{th}$ color in the color sequence measured using the $n^{th}$ commutated element, $R_n$ denotes the set of all k for which the $n^{th}$ commutated element was used, the vector Energy is similarly defined and measures the energy sequence of the target, the $n^{th}$ row and the $i^{th}$ of column of the matrix A is the response of the $n^{th}$ element of the commutated array to a signal from angle $\phi$, with the $n^{th}$ row being given by $a_{k_n}(\phi)$ for some $k_n$, diag (Energy) denotes a diagonal matrix where the diagonal elements are given by the vector Energy and the other elements are zero.

2. A method of estimating multiple angles of arrival of a target signal received by an array of commutated antenna elements, comprising the steps of:
   (a) obtaining samples of a received target signal from an array of commutated antenna elements and from an element in an array of reference antenna elements;
   (b) with a computer, processing the obtained samples of the received target signal to make maximum-likelihood-estimations of multiple angles of arrival at which signals are received by the array of commutated antenna elements; and
   (c) mapping a display over time and frequency of said estimations, with the angle of arrival for a particular sample being represented by a variable given display feature.

3. A method according to claim 2, wherein the variable display feature is color so that an estimation over time of the angle of arrival for a particular sample within a band of frequencies is displayed as a sequence of colored rectangles.

4. A method according to claim 3, wherein the displayed color is argColor{$R_i$}, wherein Color ($R_i$) is determined in accordance with: Color($R_i$)=$\Sigma_{n \in R_i} y_{C,n} \overline{y_{R,n}}$; and wherein $y_C$ denotes an individual sample of the received target signal obtained from a single commutated antenna array element, $y_R$ denotes a sample of the received target signal obtained from a reference antenna array element; and n ranges over time and frequency.

5. A method according to claim 3, wherein step (c) comprises the step of:
   (d) displaying said estimations in separate columns of colored rectangles for each set of the sequentially obtained samples.

6. A method according to claim 3, further comprising the step of:

(d) constructing a classifier that labels a subset of rectangles as either a target instance or not.

7. A method according to claim 3, wherein step (c) comprises the step of:
(d) clustering displayed indicia for multiple estimations of the angle of arrival for signals received from multiple targets in accordance with similarities and differences in rectangle color-sequence patterns.

8. A method according to claim 2, further comprising one of more of the following steps:
(d) processing the display to determine that a target signal is being received by the array of commutated antenna elements;
(e) processing the display to estimate parameters of said received target signal;
(f) associating multiple displayed rectangles with a single received target signal.

9. A method according to claim 2, further comprising at least one of the following steps:
(d) processing the displayed estimations to determine that a target signal is being received by the array of commutated antenna elements;
(e) processing the displayed estimations to estimate parameters of the received target signal;
(f) processing the estimations to associate multiple displayed estimations with a single received target signal.

10. A method of estimating multiple angles of arrival of a target signal received by an array of commutated antenna elements, comprising the steps of:
(a) obtaining samples of a received signal from an array of commutated antenna elements and from an element in an array of reference antenna elements;
(b) with a computer, processing the obtained samples of the received target signal to make maximum-likelihood-estimations of multiple angles of arrival at which signals are received by the array of commutated antenna elements;
(c) mapping a display of a distributions of said estimations over the angle of arrival for arbitrarily numbered received target signals; and
(d) identifying the angle of arrival that is most prevalent in this distribution as a reflected angle.

11. A non-transitory computer readable storage medium for use with a computer in a system for estimating multiple angles of arrival of a target signal received by an array of commutated antenna elements, wherein samples of a received target signal are obtained from an array of commutated antenna elements and from an element in an array of reference antenna elements; a computer is adapted for processing the obtained samples of the received signal to estimate multiple angles of arrival of a target signal received by the array of commutated antenna elements, and for mapping a display over time and frequency of said estimations, with the angle of arrival for a particular sample being represented by a variable color; and
wherein the computer readable storage medium contains computer executable program instructions for causing the computer to make maximum-likelihood-estimations $\phi_{MLE}$ of the multiple angles of arrival at which the target signal is received by the array of commutated antenna elements in accordance with the following computer processing step:

$$\underline{\phi}_0 \leftarrow \mathrm{argmax}_\phi \underline{\mathrm{Color}} * A(A * \mathrm{diag}(\underline{\mathrm{Energy}})A)^{-1} A * \underline{\mathrm{Color}}$$

$$A_n \leftarrow a_{k_n}(\underline{\phi})$$

$$\underline{\mathrm{Color}}_n \leftarrow \sum_{k \in R_n} y_{C,k} \overline{y_{R,k}}$$

$$\underline{\mathrm{Energy}}_n \leftarrow \sum_{k \in R_n} y_{R,k} \overline{y_{R,k}}$$

wherein $\phi_0$ approaches $\phi_{MLE}$; the subscript i denotes the iteration number, $y_C$ denotes an individual sample of the received target signal obtained from a single commutated antenna array element, $y_R$ denotes a sample of the received target signal obtained from the reference antenna array element; n ranges over time and frequency, the vector $a_{k_n}(\underline{\phi})$ is the nth row of the matrix A, Color is a vector with tuples that are the color sequence of the target, the $n^{th}$ tuple $\mathrm{Color}_n$ denotes the $n^{th}$ color in the color sequence measured using the $n^{th}$ commutated element, $R_n$ denotes the set of all k for which the $n^{th}$ commutated element was used, the vector Energy is similarly defined and measures the energy sequence of the target, the $n^{th}$ row and the $i^{th}$ of column of the matrix A is the response of the $n^{th}$ element of the commutated array to a signal from angle $\phi$, with the $n^{th}$ row being given by $a_{k_n}(\underline{\phi})$ for some $k_n$, diag (Energy) denotes a diagonal matrix where the diagonal elements are given by the vector Energy and the other elements are zero.

12. A non-transitory computer readable storage medium for use with a computer in a system for estimating multiple angles of arrival of a target signal received by an array of commutated antenna elements, wherein samples of a received target signal are obtained from an array of commutated antenna elements and from an element in an array of reference antenna elements; and
wherein the computer readable storage medium contains computer executable program instructions for causing the computer to perform the steps of:
(a) processing the obtained samples of the received target signal to make maximum-likelihood-estimations of multiple angles of arrival at which signals are received by the array of commutated antenna elements; and
(b) mapping a display over time and frequency of said estimations, with the angle of arrival for a particular sample being represented by a variable given display feature.

13. A non-transitory computer readable storage medium for use with a computer in a system for estimating multiple angles of arrival of a target signal received by an array of commutated antenna elements, wherein samples of a received target signal are obtained from an array of commutated antenna elements and from an element in an array of reference antenna elements; and
wherein the computer readable storage medium contains computer executable program instructions for causing the computer to perform the steps of:
(a) with a computer, processing the obtained samples of the received target signal to make maximum-likelihood-estimations of multiple angles of arrival at which signals are received by the array of commutated antenna elements;
(b) mapping a display of a distributions of said estimations over the angle of arrival for arbitrarily numbered received target signals; and
(c) identifying the angle of arrival that is most prevalent in this distribution as a reflected angle.

* * * * *

UNITED STATES PATENT AND TRADEMARK OFFICE
CERTIFICATE OF CORRECTION

PATENT NO. : 8,648,749 B1  
APPLICATION NO. : 12/908164  
DATED : February 11, 2014  
INVENTOR(S) : James Covosso Francis Page 1 of 1

It is certified that error appears in the above-identified patent and that said Letters Patent is hereby corrected as shown below:

IN THE SPECIFICATION:

at column 5, line 32, "x" should be --z--  
at column 7, line 11, "arg min" should be --argmin--  
at column 7, line 49, in the equation "i" should be --n--

IN THE CLAIMS:

at column 14, line 23, insert --$n^{th}$-- before --tuple-- at column 14, line 30, after "$\phi$" (first occurrence) insert subscript --i-- at column 15, line 65, in the equation "argmax$\phi$" should be --argmax$_\phi$-- at column 16, line 24, after "$\phi$" (first occurrence) insert subscript --i--

Signed and Sealed this
Seventeenth Day of February, 2015

Michelle K. Lee
*Deputy Director of the United States Patent and Trademark Office*